US012560920B2

(12) United States Patent (10) Patent No.: US 12,560,920 B2
Pylkkönen et al. (45) Date of Patent: Feb. 24, 2026

(54) SELF-CORRECTING VERTICAL FLATNESS IN A GLASS TEMPERING SYSTEM

(71) Applicant: Cardinal IG Company, Eden Prairie, MN (US)

(72) Inventors: Jarmo T. Pylkkönen, Eden Prairie, MN (US); Jacob N. Gursky, Eden Prairie, MN (US)

(73) Assignee: Cardinal IG Company, Eden Prairie, MN (US)

( * ) Notice: Subject to any disclaimer, the term of this patent is extended or adjusted under 35 U.S.C. 154(b) by 535 days.

(21) Appl. No.: 17/961,717

(22) Filed: Oct. 7, 2022

(65) Prior Publication Data

US 2023/0212055 A1 Jul. 6, 2023

Related U.S. Application Data

(60) Provisional application No. 63/297,074, filed on Jan. 6, 2022.

(51) Int. Cl.
C03B 27/052 (2006.01)
C03B 27/012 (2006.01)
(Continued)

(52) U.S. Cl.
CPC ...... G05B 19/41875 (2013.01); C03B 27/012 (2013.01); C03B 27/0528 (2013.01);
(Continued)

(58) Field of Classification Search
CPC ... C03B 27/0528; C03B 27/012; C03B 29/08; C03B 27/0417; C03B 29/10;
(Continued)

(56) References Cited

U.S. PATENT DOCUMENTS 4,361,428 A 11/1982 Bartusel et al.
4,397,672 A 8/1983 Nitschke
(Continued)

FOREIGN PATENT DOCUMENTS

BE 786807 A1 11/1972
CN 105084729 A 11/2015
(Continued)

OTHER PUBLICATIONS

Lampinen, P., "Analysis of Glass Tempering Furnace Data," Master of Science Thesis, Jan. 31, 2020, 71 pages.
(Continued)

*Primary Examiner* — Charles R Kasenge
(74) *Attorney, Agent, or Firm* — Fredrikson & Byron, P.A.

(57) ABSTRACT

This disclosure is directed to techniques for utilizing various sensors and models to evaluate glass as it progresses through the tempering process in order to ensure that the tempered glass is of a proper quality. If, according to any of the various sensor measurements, the tempered glass is not of a proper quality, the system may automatically adjust one or more settings in any of the various components of the system in order to bring future panes of tempered glass back to having the proper quality. The system can measure for any number of glass characteristics or system characteristics, including edge quality, vertical flatness, haze, washing process variables, thermal imaging, distortion, blower information, production data, and furnace process data.

17 Claims, 9 Drawing Sheets

(51) Int. Cl.

| | | |
|---|---|---|
| *C03B 29/08* | (2006.01) | |
| *G01N 21/89* | (2006.01) | |
| *G05B 13/02* | (2006.01) | |
| *G05B 19/418* | (2006.01) | |
| *G06T 7/00* | (2017.01) | |
| *G06N 20/00* | (2019.01) | |
| *G06V 10/764* | (2022.01) | |

(52) U.S. Cl.

CPC ......... *C03B 29/08* (2013.01); *G01N 21/8901* (2013.01); *G05B 13/0265* (2013.01); *G06T 7/0004* (2013.01); *G05B 19/4183* (2013.01); *G06N 20/00* (2019.01); *G06V 10/764* (2022.01)

(58) Field of Classification Search

CPC ........... G01N 21/8901; G05B 13/0265; G05B 2219/45009; G05B 19/4183; G05B 19/41875; G06N 20/00; G06T 7/0004; G06V 10/764

See application file for complete search history.

(56) References Cited

U.S. PATENT DOCUMENTS

| | | | |
|---|---|---|---|
| 4,601,743 | A | 7/1986 | Canfield |
| 4,655,589 | A | 4/1987 | Cestaro et al. |
| 4,807,144 | A | 2/1989 | Joehlin et al. |
| 5,053,604 | A | 10/1991 | Escaravage et al. |
| 5,236,488 | A | 8/1993 | Vehmas |
| 5,305,224 | A | 4/1994 | Hishida et al. |
| 6,131,412 | A | 10/2000 | Vehmas |
| 6,796,144 | B2 | 9/2004 | Shepard et al. |
| 7,484,386 | B2 | 2/2009 | Janhunen |
| 7,548,796 | B2 | 6/2009 | Tanaka et al. |
| 7,710,558 | B2 | 5/2010 | Wornson et al. |
| 8,260,441 | B2 | 9/2012 | Scheega et al. |
| 2003/0076487 | A1 | 4/2003 | Cannon et al. |
| 2004/0188005 | A1* | 9/2004 | Pearson ................ B44C 1/1712 |
| | | | 156/230 |

| | | | |
|---|---|---|---|
| 2009/0199594 | A1 | 8/2009 | Abbott et al. |
| 2018/0224381 | A1 | 8/2018 | Vild et al. |
| 2019/0376909 | A1 | 12/2019 | Hegstrom et al. |
| 2020/0165154 | A1 | 5/2020 | Zhao et al. |
| 2021/0114917 | A1* | 4/2021 | Leskinen ................ C03B 35/16 |
| 2021/0147278 | A1 | 5/2021 | Zhao et al. |
| 2021/0238077 | A1 | 8/2021 | Aronen et al. |

FOREIGN PATENT DOCUMENTS

| | | | | |
|---|---|---|---|---|
| CN | 105095273 | A | 11/2015 | |
| CN | 105241511 | A | 1/2016 | |
| CN | 105866137 | A | 8/2016 | |
| CN | 106527141 | A | 3/2017 | |
| CN | 106773682 | A | 5/2017 | |
| DE | 102008045416 | A1 | 3/2010 | |
| EP | 1829836 | A1 | 9/2007 | |
| EP | 3588221 | A1 * | 1/2020 | ............. C03B 29/08 |
| EP | 3929671 | A4 | 12/2021 | |
| FI | 20185802 | A1 | 3/2020 | |
| JP | 2020085774 | A | 6/2020 | |
| WO | 9744286 | A1 | 11/1997 | |
| WO | 2021057843 | A1 | 4/2021 | |
| WO | 2022263579 | A1 | 12/2022 | |

OTHER PUBLICATIONS

PCT International Search Report and Written Opinion dated Jan. 30, 2023, regarding International Application No. PCT/US2022/046169, 9 pgs.

Ruusunen, Juho. Deep neural networks for evaluating the quality of tempered glass. MS thesis. 2018. https://trepo.tuni.fi/bitstream/handle/123456789/26467/ruusunen.pdf?sequence=4&isAllowed=y, 81 pages.

Alcobaca, Edesio, et al. "Explainable machine learning algorithms for predicting glass transition temperatures." Acta Materialia 188 (2020): 92-100.https://www.researchgate.net/profile/Daniel-Cassar-3/publication/338931718_Explainable_Machine_Learning_Algorithms_To_Predict_Glass_Transition_Temperature/links/5e38756492851c7f7f1a383f/Explainable-Machine-Learning-Algorithms-To-Predict-Glass-Transition-Temperature.pdf, 15 pages.

* cited by examiner

CONTROL CAMERA SYSTEM TO CAPTURE IMAGES OF EDGES OF ANNEALED GLASS —602

ANALYZE IMAGES USING MACHINE LEARNING MODEL —604

DETERMINE WHETHER TO MAKE ADJUSTMENTS TO INITIAL SET OF EDGING PARAMETERS —606

AUTOMATICALLY ADJUST EDGING PARAMETERS TO DEVELOP UPDATED SET OF EDGING PARAMETERS —608

702
CONTROL SCANNER SYSTEM TO
MEASURE VERTICAL FLATNESS DATA
POINTS FOR TEMPERED GLASS

704
APPLY MACHINE LEARNING MODEL TO
DATA POINTS

706
DETERMINE WHETHER TO MAKE
ADJUSTMENTS TO INITIAL SET OF
FURNACE PARAMETERS

708
AUTOMATICALLY ADJUST FURNACE
PARAMETERS TO DEVELOP UPDATED
SET OF FURNACE PARAMETERS

902

CONTROL ONE OR MORE SENSORS TO
MEASURE ONE OR MORE ASPECTS OF A
PIECE OF GLASS

904

APPLY MACHINE LEARNING MODEL TO
MEASURED ASPECTS

906

DETERMINE WHETHER TO MAKE
ADJUSTMENTS TO OPERATION
PARAMETERS IN GLASSMAKING
PROCESS

908

AUTOMATICALLY ADJUST OPERATION
PARAMETERS TO DEVELOP UPDATED
SET OF OPERATION PARAMETERS

SELF-CORRECTING VERTICAL FLATNESS IN A GLASS TEMPERING SYSTEM

PRIORITY INFORMATION

This application claims the benefit of U.S. Provisional Application No. 63/297,074, filed Jan. 6, 2022, the entire content of which is incorporated herein.

TECHNICAL FIELD

The disclosure relates to glass tempering machinery.

BACKGROUND

Tempered glass is much stronger than standard glass. Tempered glass breaks in a special way. It does not break into large dangerous shards. And if any part of the glass breaks, then the entire pane shatters. Tempered glass is manufactured by a process that involves intense heating and rapid cooling, making it harder than standard glass. Tempered glass may be characterized, for example, as having a surface compression of greater than about 10,000 psi.

In tempering, glass is commonly placed in a furnace maintained at about 680-705° C. (preferably controlled to 690-700° C.). The glass is typically held in the furnace for 100-120 seconds with constant movement to better ensure temperature uniformity of the product. This is intended to raise the glass temperature to about 640° C. The glass is then removed from the furnace and cooled rapidly in a stream of air for about 50 seconds such that the glass is cool enough for an operator to handle.

The process of creating tempered glass is very specific and very manual, requiring individuals to monitor the machinery, inspect the glass, and make any adjustments needed to the overall system. There are a number of different components, each of which must be monitored and maintained in this way.

SUMMARY

In general, the disclosure describes techniques where a computing device controls one or more sensors to measure one or more aspects of a piece of glass. The computing device applies a machine learning model to the one or more aspects of the piece of glass. Based on this analysis, the computing device determines whether to make one or more adjustments to any operation parameters of the glass tempering system in the glassmaking process. In response to determining to make the one or more adjustments, the computing device automatically adjusts the operation parameters of the glass tempering system in the glassmaking process.

Using the techniques described herein, a computing device may optimize the various components of a glass tempering system in an effort to create a tempered glass product with minimal defects. By integrating particular sensors placed at particular locations throughout the glass tempering system, the computing device may receive real-time, or near real-time, information that provides insight to each step of the glass tempering process as the process is occurring. The computing device applies the machine learning model to that at least near real-time information measured by the particular sensors in order to determine whether there is any portion of the process performing in a sub-optimal manner. By integrating the particular physical machinery components of the glass tempering process into the techniques described herein, the computing device can control those physical machinery components using the at least near real-time information measured by the particular sensors in particular locations in order to minimize the amount of defects present in the tempered glass product and reduce the amount of waste resulting from those defects.

In one example, the disclosure is directed to a method comprising, after a first sheet of annealed glass exits an edge seamer operating under an initial set of one or more edging parameters, controlling, by one or more processors, a camera system to capture one or more images for one or more edges of the first sheet of annealed glass. The method further includes analyzing, by the one or more processors, the one or more images using a machine learning model to determine whether to make one or more adjustments to the initial set of one or more edging parameters. The method also includes, in response to determining to make the one or more adjustments to the initial set of one or more edging parameters, automatically adjusting, by the one or more processors, one or more edging parameters in the initial set of one or more edging parameters to develop an updated set of one or more edging parameters.

In another example, the disclosure is directed to a device comprising a memory and one or more processors. The one or more processors are configured to, after a first sheet of annealed glass exits an edge seamer operating under an initial set of one or more edging parameters, control a camera system to capture one or more images for one or more edges of the first sheet of annealed glass. The one or more processors are further configured to analyze the one or more images using a machine learning model to determine whether to make one or more adjustments to the initial set of one or more edging parameters. The one or more processors are also configured to, in response to determining to make the one or more adjustments to the initial set of one or more edging parameters, automatically adjust one or more edging parameters in the initial set of one or more edging parameters to develop an updated set of one or more edging parameters.

In another example, the disclosure is directed to a system comprising an edge seamer operating under an initial set of one or more edging parameters, a camera system, and one or more processors. The one or more processors are configured to, after a first sheet of annealed glass exits the edge seamer, control the camera system to capture one or more images for one or more edges of the first sheet of annealed glass. The one or more processors are further configured to analyze the one or more images using a machine learning model to determine whether to make one or more adjustments to the initial set of one or more edging parameters. The one or more processors are also configured to, in response to determining to make the one or more adjustments to the initial set of one or more edging parameters, automatically adjust one or more edging parameters in the initial set of one or more edging parameters to develop an updated set of one or more edging parameters.

In another example, the disclosure is directed to a method comprising method comprising, after a first sheet of tempered glass exits a furnace system operating under an initial set of one or more furnace parameters, and while the first sheet of tempered glass is in a vertical position, controlling, by one or more processors, a scanner system to measure one or more vertical flatness data points for the first sheet of tempered glass. The method further includes applying, by the one or more processors, a machine learning model to determine whether to make one or more adjustments to the initial set of one or more furnace parameters based on the one or more vertical flatness data points for the first sheet of tempered glass. The method also includes, in response to determining to make the one or more adjustments to the initial set of one or more furnace parameters, automatically adjusting, by the one or more processors, one or more furnace parameters in the initial set of one or more furnace parameters to develop an updated set of one or more furnace parameters.

In another example, the disclosure is directed to a device comprising a memory and one or more processors. The one or more processors are configured to, after a first sheet of tempered glass exits a furnace system operating under an initial set of one or more furnace parameters, and while the first sheet of tempered glass is in a vertical position, control a scanner system to measure one or more vertical flatness data points for the first sheet of tempered glass. The one or more processors are further configured to apply a machine learning model to determine whether to make one or more adjustments to the initial set of one or more furnace parameters based on the one or more vertical flatness data points for the first sheet of tempered glass. The one or more processors are also configured to, in response to determining to make the one or more adjustments to the initial set of one or more furnace parameters, automatically adjust one or more furnace parameters in the initial set of one or more furnace parameters to develop an updated set of one or more furnace parameters.

In another example, the disclosure is directed to a system comprising a furnace system operating under an initial set of one or more furnace parameters, a scanner system, and one or more processors. The one or more processors are configured to, after a first sheet of tempered glass exits the furnace system, and while the first sheet of tempered glass is in a vertical position, control the scanner system to measure one or more vertical flatness data points for the first sheet of tempered glass. The one or more processors are further configured to apply a machine learning model to determine whether to make one or more adjustments to the initial set of one or more furnace parameters based on the one or more vertical flatness data points for the first sheet of tempered glass. The one or more processors are also configured to, in response to determining to make the one or more adjustments to the initial set of one or more furnace parameters, automatically adjust one or more furnace parameters in the initial set of one or more furnace parameters to develop an updated set of one or more furnace parameters.

In another example, the disclosure is directed to a method comprising method comprising, after a first sheet of tempered glass exits a furnace system operating under an initial set of one or more furnace parameters, controlling, by one or more processors, an optical haze detection system to measure one or more optical haze data points for the first sheet of tempered glass. The method further includes applying, by the one or more processors, a machine learning model to determine whether to make one or more adjustments to the initial set of one or more furnace parameters based on the one or more optical haze data points for the first sheet of tempered glass. The method also includes, in response to determining to make the one or more adjustments to the initial set of one or more furnace parameters, automatically adjusting, by the one or more processors, one or more furnace parameters in the initial set of one or more furnace parameters to develop an updated set of one or more furnace parameters.

In another example, the disclosure is directed to a device comprising a memory and one or more processors. The one or more processors are configured to, after a first sheet of tempered glass exits a furnace system operating under an initial set of one or more furnace parameters, control an optical haze detection system to measure one or more optical haze data points for the first sheet of tempered glass. The one or more processors are further configured to apply a machine learning model to determine whether to make one or more adjustments to the initial set of one or more furnace parameters based on the one or more optical haze data points for the first sheet of tempered glass. The one or more processors are also configured to, in response to determining to make the one or more adjustments to the initial set of one or more furnace parameters, automatically adjust one or more furnace parameters in the initial set of one or more furnace parameters to develop an updated set of one or more furnace parameters.

In another example, the disclosure is directed to a system comprising a furnace system operating under an initial set of one or more furnace parameters, an optical haze detection system, and one or more processors. The one or more processors are configured to, after a first sheet of tempered glass exits the furnace system, control the optical haze detection system to measure one or more optical haze data points for the first sheet of tempered glass. The one or more processors are further configured to apply a machine learning model to determine whether to make one or more adjustments to the initial set of one or more furnace parameters based on the one or more optical haze data points for the first sheet of tempered glass. The one or more processors are also configured to, in response to determining to make the one or more adjustments to the initial set of one or more furnace parameters, automatically adjust one or more furnace parameters in the initial set of one or more furnace parameters to develop an updated set of one or more furnace parameters.

In another example, the disclosure is directed to a method for performing any combination of the techniques described herein.

In another example, the disclosure is directed to a device configured to perform any combination of the techniques described herein.

In another example, the disclosure is directed to an apparatus comprising means for performing any combination of the techniques described herein.

In another example, the disclosure is directed to a non-transitory computer-readable storage medium having stored thereon instructions that, when executed, cause one or more processors of a computing device to perform any combination of the techniques described herein.

In another example, the disclosure is directed to a system comprising one or more computing devices configured to perform any combination of the techniques described herein.

In another example, the disclosure is directed to any combination of the techniques described herein.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
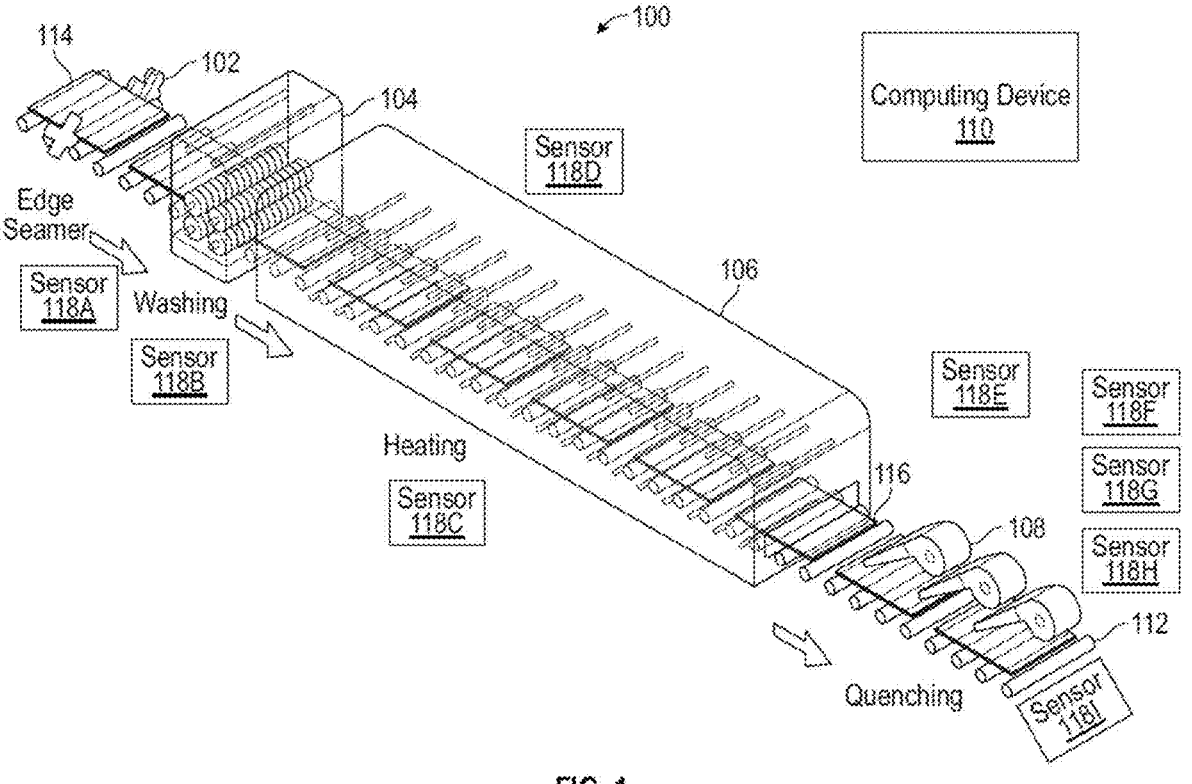
FIG. 1 is a conceptual diagram illustrating an example glass tempering system configured to perform one or more of the techniques described herein.

FIG. 1 is a conceptual diagram illustrating an example glass tempering system 100 configured to perform one or more of the techniques described herein. Glass tempering system includes seamers 102, washer 104, tempering oven 106 (also referred to herein as a "furnace" or a "heating component"), one or more air blowers 108, computing device 110, and rollers 112. Annealed glass 114 enters glass tempering system 100, moving along glass tempering system 100 on rollers 112 to each component. For instance, annealed glass 114 enters seamers 102, where annealed glass 114 is cut and the edges are defined. The glass is then washed in washer 104 before entering tempering oven 106. The glass is heated in an oven with internal temperatures up to or exceeding 1200 degrees Fahrenheit in order to create tempered glass 116. Tempered glass 116 exits tempering oven 106 where the glass is cooled, or quenched, using air blowers 108 (also referred to herein as "quenchers" or a "quenching component"). While the example of FIG. 1 uses rollers 112 to connect each of seamers 102, washer 104, tempering oven 106, and air blowers 108, in other examples, different structures could be used to transport the sheets of glass between components, including conveyor belts, forklifts, carts, or manual transportation.

Seamers 102 may include any machine or system used to perform a seaming process on annealed glass. Seaming can be performed wet or dry. These methods vary due to preference and application. Both methods are designed to achieve the same result, but inherently have their own advantages and drawbacks. There are also numerous automated systems utilizing other grinding or sanding methods that again are typically selected due to application and preference. Suitable conventional seamers are commercially available from various well-known commercial suppliers, such as LiSEC America, Inc., of Burnsville, Minnesota, USA.

When dealing with tempered glass, strength and durability are key, but safe handling is also desirable. All of these factors are enhanced by glass seaming, or sanding the edges of sharp, cut glass. The unseamed edge of a lite of glass is susceptible to flaking off while undergoing the heating process, causing unwanted ceramic roll contamination within the furnace. Technically, the strongest glass edge is a proper, clean cut edge on an annealed lite of glass but realistically, the difference is measurable in annealed glass but insignificant after tempering since the glass is now 4 to 5 times stronger than it was in its previous annealed state.

Proper seaming/edging is desirable for the glass tempering process. If seaming is poorly executed, small fractures can occur in the glass where it meets the seaming machine belt. These fractures release small particles that are not removed by washing, and remain on the glass when it enters the furnace. The particles can also stick to the rollers, damaging and pitting other glass. In order to perform optimal edging, glass traveling speed, the correct use and placement of stop wheels, sanding belt grit, seaming pressure, belt tensions, pressure against the belt, belt quality, and temperature all must be controlled.

Washer 104 may be any device or system configured to wash or clean the glass after the seaming process. Though the glass tempering process itself controls the specifications of the finished product, pre-processing the glass before it goes into tempering oven 106 can also be beneficial. This pre-processing includes cutting, edging and glass washing. Washing the glass after cutting, edging, and handling cleans the glass of any debris, dust, and glass chips that may still be on the surface of the glass. If there is any surface protection on the glass, such as coatings to enable safe handling or protect it from damage, washing can also remove these and any resulting residue.

The benefits of removing these impurities before the glass enters the furnace are twofold. First, any dirt or glass dust that is on the glass can damage the glass during the tempering process, leaving scratches, pockmarks and dents in the glass. While debris may not be visible directly after tempering, little bits of dust and glass chips adhered to the glass can be dislodged during later cleaning methods (window washing, scraping) leaving scratches across the glass.

Second, washing glass early in the glass tempering process also keeps these impurities out of your furnaces. Once inside a furnace, these impurities adhere to ceramic rollers, leaving them to not only attach themselves to later pieces of glass coming through, but also increasing wear and shortening the rollers' lifespan. Increased quality, reduced waste and loss of glass all lead to increased efficiency and savings. Aspects of the washing process that may affect the effectiveness of washer 104 include mineral content in the water, the presence of detergent, the softness of brushes in washer 104, glass travelling speed, the presence of residue after the cleaning process, water temperature, and water pressure.

Tempering oven 106 may be any device or system able to receive sheets of glass and produce internal temperatures inside of tempering oven 106 up to or exceeding 1200 degrees Fahrenheit. Tempering ovens may allow the glass to heat up to about 630 degrees Centigrade, or about 1,165 Fahrenheit. When inserted, the glass rolls over rollers 112, which may be ceramic, to ensure even heating. Uneven heating in tempering oven 106 can cause many issues such as bowing, edge-wrinkling and shape changes. Any of these conditions can affect the strength of the glass. Tempering oven 106 may also use convection to move the air and create even heating. This can either be done using blowers or naturally through openings on either side of the oven. Using a tempering oven 106 is typically a very manual process that involves a lot of experience as a lot can go wrong due to a number of factors such as thickness of the glass, heating time, internal temperature, glass travelling speed, and more. Suitable conventional tempering ovens, and related tempering equipment, are commercially available from various well-known commercial suppliers, such as Glaston America, Inc., of Cherry Hill, New Jersey, USA.

Air blowers 108 may be any device or system able to expel high-pressure air blasts in the direction of the glass after it exits tempering oven 106. After exiting tempering oven 106, the glass then undergoes a high-pressure cooling procedure called "quenching." During this process, which lasts just seconds, air blowers 108 expel high-pressure air blasts towards the surface of the glass from an array of nozzles in varying positions. Quenching cools the outer surfaces of the glass much more quickly than the center. As the center of the glass cools, it tries to pull back from the outer surfaces. As a result, the center remains in tension, and the outer surfaces go into compression, which gives tempered glass its strength.

Glass in tension breaks about five times more easily than it does in compression. Annealed glass will break at 6,000 pounds per square inch (psi). Tempered glass, according to federal specifications, must have a surface compression of 10,000 psi or more; it generally breaks at approximately 24,000 psi.

Computing device 110 may be any computer with the processing power required to adequately execute the techniques described herein. For instance, computing device 110 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/ extended reality (VR/AR/XR) system, a video game or streaming system, a network modem, router, or server system, or any other computerized device that may be configured to perform the techniques described herein.

Glass tempering system 100 may also include any one or more of sensors 118A-118I (collectively, sensors 118). Sensors 118 may include any type of camera, optical sensor, temperature sensor, light sensor, water sensor, pressure sensor, velocity sensor, or other type of sensor that is able to measure one or more data points of a piece of glass or an environment that the piece of glass is in. Computing device 110 may receive that data and analyze the data in an effort to optimize the glass tempering process.

In accordance with the techniques described herein, computing device 110 controls any one or more of sensors 118 to measure one or more aspects of a piece of glass. Computing device 110 applies a machine learning model to the one or more aspects of the piece of glass. Based on this analysis, computing device 110 determines whether to make one or more adjustments to any operation parameters of the glass tempering system in the glassmaking process. In response to determining to make the one or more adjustments, computing device automatically adjusts the operation parameters of the glass tempering system in the glassmaking process.

In the example of FIG. 1, sensor 118A may be any one or more of a camera system and any other optical sensor that can capture images or detect textures once annealed glass 114 exits seamer 102. Sensor 118A may transmit the images or texture data to computing device 110, which may analyze the images or texture data to determine a quality of the edges, or whether the edges include any of a number of defects. For example, computing device 110 may detect any of the edge defects depicted in FIGS. 5A-5K, including a convolution pattern, a shark teeth pattern, a frost pattern, a rubble pattern, a run line pattern, a light serration hackle, a light serration hackle with a flake chip, a shell chip, a serration hackle with spalls, impact damage, a heavy shark teeth pattern with a serration hackle, and a deep serration hackle with a deep shark teeth pattern. Using a machine learning model that correlates various operating parameters in glass tempering system 100 with higher quality tempered glass, if computing device 110 detects any of these defects in the images or texture data, or detects any of these defects with a certain level of consistency (e.g., three sheets of glasses consecutively), computing device 110 may automatically determine that seamer 102 should be adjusted to avoid additional defects. As such, computing device 110 may control seamer 102 to adjust any one or more of seaming belt pressure, seaming belt distance from the glass edge, belt pressure, belt rotating speed, and glass transfer speed.

Sensor 118B may be any one or more of a water sensor, a composition sensor, a temperature sensor, a humidity sensor, or any other sensor to analyze glass or environment data in washer 104. Sensor 118B may measure data regarding the glass as it passes through washer 104, the water used to wash the glass in washer 104, the temperature within washer 104, the humidity within washer 104, or any other piece of information that may affect the quality of tempered glass that is pre-processed using washer 104 and transmit that data to computing device 110. Using a machine learning model that correlates various operating parameters in glass tempering system 100 with higher quality tempered glass, if computing device 110 determines that any of the received data could lead to lower-quality tempered glass, computing device 110 may alter one or more operating parameters of washer 104, including adjusting the water used in the washing process, the water pressure, the water composition, the temperature, the water amount, the glass transfer speed, the belt rotating speed, or any other operational aspect of washer 104.

Sensor 118C may be any one or more of a temperature sensor, a pressure sensor, a velocity sensor (angular or linear), or any other sensor that may measure furnace process data within tempering oven 106. Sensor 118C can detect conditions within tempering oven 106 and send those conditions to computing device 110. Using a machine learning model that correlates furnace operating parameters with higher quality tempered glass, computing device 110 can control tempering oven 106 to adjust any operating or process parameters, such as internal temperature, convection speed, belt speed, roller speed, or any other number of furnace operating parameters.

Sensor 118D may be any one or more of dimension sensors, optical sensors, velocity sensors, logistical sensors, and one or more modules in an enterprise resource planning system that controls production flow in tempering system 100. Sensor 118D may analyze annealed glass 114 and tempered glass 116 to determine glass dimensions, glass positions, and individual load patterns as the glass proceeds through tempering system 100. Using a machine learning model that correlates various operating parameters in glass tempering system 100 with higher quality tempered glass, computing device 110 may, after receiving the data from sensor 118D, control rollers 112 and any other component in tempering system 100 to adjust roller speed, load patterns, or other production flow aspects of tempering system 100 to produce higher quality tempered glass.

Sensor 118E may be any one or more of a camera, a thermal scanner, an infrared camera, or any other sensor capable of capturing a thermal image of tempered glass 116 as it exits tempering oven 106. Sensor 118E may send the thermal image to computing device 110, which determines temperature data for the tempered glass upon exiting tempering oven 106. Using a machine learning model that correlates various operating parameters in glass tempering system 100 with higher quality tempered glass, if computing device 110 determines that the temperature of the tempered glass upon exiting tempering oven 106 is either too high or too low, computing device 110 may adjust any number of operating parameters in tempering oven 106 based on the optimal parameters in the machine learning model in an effort to produce higher quality tempered glass.

Sensor 118F may be any one or more of a camera, an optical sensor, a quality monitoring system, and a scanner system that can analyze various vertical flatness data points of tempered glass as it exits the quenching phase. For instance, when the tempered glass is stored vertically, sensor 118F may detect whether the tempered glass is warped or contains any bubbles or lumps that cause the tempered glass to not be flat. Using a machine learning model that correlates various operating parameters in glass tempering system 100 with higher quality tempered glass, if computing device 110 determines that the vertical flatness data indicates a lower quality tempered glass, computing device 110 may control various components in glass tempering system 100, such as seamer 102, washer 104, tempering oven 106, air blowers 108, or rollers 112 to change various operating parameters of those components, including heating temperature, loading delay, heating time, convection values, air balance, nozzle distance, quench pressure, roller speed, cooling temperature, and fan speed.

Sensor 118G may be a haze scanning system configured to measure haze (e.g., a defect in the tempered glass). Haze can be the result of dust, roller residuals, or actual mechanical deformations caused by a mechanical pressure that is too strong between the glass and the rollers. Haze can be caused by multiple reasons and can occur in several different forms. Haze can occur in the center of the glass, near the ends of the glass, on the corners of the glass, or all over the glass with vague hazy areas or some repetitive stripes or marks. Sensor 118G may transmit the haze data to computing device 110. Using a machine learning model that correlates various operating parameters in glass tempering system 100 with higher quality tempered glass, if computing device 110 determines that the haze data indicates a lower quality tempered glass, computing device 110 may control various components in glass tempering system 100, such as seamer 102, washer 104, tempering oven 106, air blowers 108, or rollers 112 to change various operating parameters of those components, including heating temperature, convection speed, roller speed, cooling temperature, and fan speed.

Sensor 118H may be any one or more of a pressure sensor, a temperature sensor, a humidity sensor, or any other sensor able to measure data affecting the quality of tempered glass in a region that contains air blowers 108 performing the quenching process. Sensor 118H may measure blower room data including air pressure of the air coming from air blowers 108, room temperature, temperature of the air coming from air blowers 108, speed of the air coming from air blowers 108, and room humidity levels. Sensor 118H may transmit that blower room data to computing device 110. Using a machine learning model that correlates various operating parameters in glass tempering system 100 with higher quality tempered glass, if computing device 110 determines that the blower room data indicates non-ideal conditions for the quenching process, computing device 110 may control air blowers 108 or environmental devices in the quenching room to change various operating parameters of those devices in an effort to correct the blower room data.

Sensor 118I may be any one or more of an optical sensor, a camera, a high-speed camera, and a distortion sensing system able to measure various distortion data in a sheet of tempered glass. Using the distortion data, computing device 110 may detect any number of distortion defects in the tempered glass, including bi-stability, saddle bow, local bow, roll wave, edge kink, center kink, vertical kink, pocket, hammer, bird's eye, picture framing, belly banding, and edge lift, among other distortion defects. Using a machine learning model that correlates various operating parameters in glass tempering system 100 with higher quality tempered glass, if computing device 110 determines that the sheet of tempered glass contains any distortion defects, computing device 110 may control various components in glass tempering system 100, such as seamer 102, washer 104, tempering oven 106, air blowers 108, or rollers 112 to change various operating parameters of those components in an effort to reduce the likelihood of additional sheets of tempered glass containing the same defect.

The machine learning model used by computing device 110 may contain information that associates various measured data and various operating parameters with various quality characteristics, and may contain this information for each potential size, thickness, and type of tempered glass created in glass tempering system 100. As more sheets of glass are analyzed at various operating parameter points, computing device 110 may update the machine learning model to indicate whether glass tempering system 100, at its current operating parameters, produce glass without defects. If the analyzed glass is without defects throughout the process, computing device 110 may update the machine learning model to indicate that this specific set of operating parameters produced an instance of defect-free glass. If the analyzed glass contains defects, as measured by any of sensors 118 and detected by computing device 110, computing device 110 may update the machine learning model to indicate that this specific set of operating parameters produced an instance of that defect.

When computing device 110 detects a defect, computing device 110 may compare the current operating parameters of the component with the operating parameters, or range of operating parameters, that tend to produce quality tempered glass. If computing device 110 determines that one or more of the parameters are outside of the generally acceptable range, computing device 110 may control the particular component of glass tempering system 100 such that the operating parameter moves into the acceptable range. If computing device 110 determines that all of the parameters are within the generally acceptable range, computing device 110 may either make smaller changes to parameters closest to the extremes of the acceptable range or may determine if multiple sheets of tempered glass each have a same defect (e.g., three out of five, two out of three, five out of ten, etc.) before making any adjustments.

Computing device 110 may determine the acceptable ranges as the ranges where a certain percentage of tempered glass (e.g., 75%, 90%, 95%, 99%, etc.) are defect free or only include very minor defects. As such, as more data becomes available through evaluation of tempered glass in the system, these acceptable ranges may be adjusted. In some instances, the machine learning model may be universal across multiple locations. In other instances, the machine learning model may be specific to a particular facility or location. This may be beneficial in instances where a particular company has different facilities in different climates. For example, different quenching parameters may be needed for a facility located in a hot, dry location such as Arizona, compared to a hot, humid location such as Florida, compared to a cold, dry location such as Minnesota, and compared to a cold, humid location such as New York.

The machine learning model may also optimize temperatures and heat times using distortion and breakage data. Using the machine learning model, computing device 110 may maximize heating uniformity in real-time. Machine learning models will monitor the condition of the equipment, and based on changes in the mechanical or electrical condition of the equipment, models may compensate this by adjusting the process parameters Loading delay is a parameter that will increase the waiting time at the loading table. This is at the moment a set value that is same for each load pattern. To automate this parameter, computing device 110 may analyze the loading pattern and length of the load and adjust the loading delay accordingly. For instance, for a load length of 2000 mm or less, the loading delay may be 0 s. For a load length of 2001-3500 mm, the loading delay may be 5 s for 3 mm, 10 s for 4 mm, 15 s for 5 mm, 20 s for 6 mm, and 25 s for 8 mm products. For a load length of 3501 mm-4800 mm, the loading delay may be 10 s for 3 mm, 15 s for 4 mm, 20 s for 5 mm, 25 s for 6 mm and 30 s for 8 mm. By automating the loading delay, computing device 110 can optimize the process and increase the productivity of the line.

For heating time, having the edge quality information available and when the edge quality is inside the suggested seaming width, computing device 110 may control the heating time based on the load pattern and individual glass sizes. If the edge quality is outside the suggested limits, computing device 110 may automatically add 3-5% longer heating time to enable higher exit temperature to the glass. This will also increase the thermal expansion for the heated glass pieces as well as lower the viscosity. This overheated method will fix the micro fractures that the edge seaming did not eliminate when in the lower limits. The overheating method will fix the micro fractures that the over seaming did to the edges when over the higher limit. In each scenario, glass distortion values will increase, but glass might make it through the process despite the poor edge quality.

Heating time will also adjust automatically based on the historical distortion measurements, historical data and thermal scanner temperature range. If the glass exit temperature (i.e., the temperature of the glass itself as it exits tempering oven 106) is between the recommended values, heating time will not change. If the heating time is outside the recommended values, then the heating time will change automatically and adjustments will vary based on the thickness of the glass. +/−5 Degrees difference and heating time change will be 3 mm 2 s, 4 mm 3 s, 5 mm 4 s, 6 mm 5 s and 8 mm 8 s.

For furnace temperatures, computing device 110 may monitor the furnace temperature behavior and adjust the temperatures according to the thermal scanner temperature, load pattern, historical data, and glass sizes. Computing device 110 may locate production patterns that will start causing the furnace temperatures to drop and will automatically adjust the temperatures accordingly. Each glass type and thickness may have set low/high limits and automated adjustments will stay inside the set limits. In a case of issues, computing device 110 may inform the user as there might be some mechanical issues with the equipment that might cause some abnormal behavior for the autonomous control system. Temperatures may also adjust based on the condition of the equipment. For instance, if there is a broken heating element in one area, computing device 110 may automatically recognize this scenario and increase the furnace temperatures to the zones next to the broken one.

For convection values, each glass type and thickness may have a set of convection profile values. Computing device 110 may set the values to be as accurate as possible based on the historical data. Sensors 118 may measure the convection air temperature and the air pressure for the convection system. Computing device 110 may control the convection fans and compressed convection system based on the measurements and historical data where the outcome has been the best with the overall quality.

For quench pressure, outside temperature, inside temperature, and the air temperature moving to the blower units are measured and computing device 110 may automatically adjust the quench pressure parameter values based on the air temperature. Each thickness and glass type may have a percentage adjustment value. If the air temperature is staying inside +/−10 degrees Celsius of the optimal value, computing device 110 may not adjust the pressure. If the pressure is within +/−15 to 20 degrees Celsius, then computing device 110 may adjust the quench pressure 10% for 3 mm, 8% for 4 mm, 6% for 5 mm, 5% for 6 mm and 4% for 8 mm. If the air temperature is 20 to 25 degrees Celsius outside of the nominal range, then the adjustment may be 12% for 3 mm, 10% for 4 mm, 8% for 5 mm, 6% for 6 mm and 5% for 8 mm.

Air balance may correct the flatness of the glass that will vary in the flat glass tempering process based on the load pattern and how uniformly the glass has been heated in the furnace. Air balance may control the air flow between the top and bottom nozzles in the quenching process. An automated flatness measurement device may measure the end result after the tempering line. Computing device 110 may check what process parameters gave the best flatness results and, based on the historical data, as well as the flatness measurement device, computing device 110 may automatically control the air balance values, trying to keep the end result as good as possible.

For furnaces that have independent quench nozzle adjustment, it is possible to correct the flatness issues the same way as with the air balance. The nozzle distance is a physical measurement and distance from the surface of the glass. By adjusting the nozzle distance, computing device 110 may adjust the quench air velocity and shape of the air spray from the nozzle holes. By adjusting the distance, computing device 110 can control the glass flatness. Quench nozzle distance settings would be controlled in a similar way as the air balance setting.

To the extent that any specific measurements and adjustments are described above and throughout this disclosure, it should be understood that these are merely examples of potential measurements and adjustments. Based on specific circumstances, different instances of these measurements or adjustments may be utilized. These specific values are mentioned only as examples, and should not be understood to be the only measurements or adjustments possible using the techniques of this disclosure.

Figure 2:
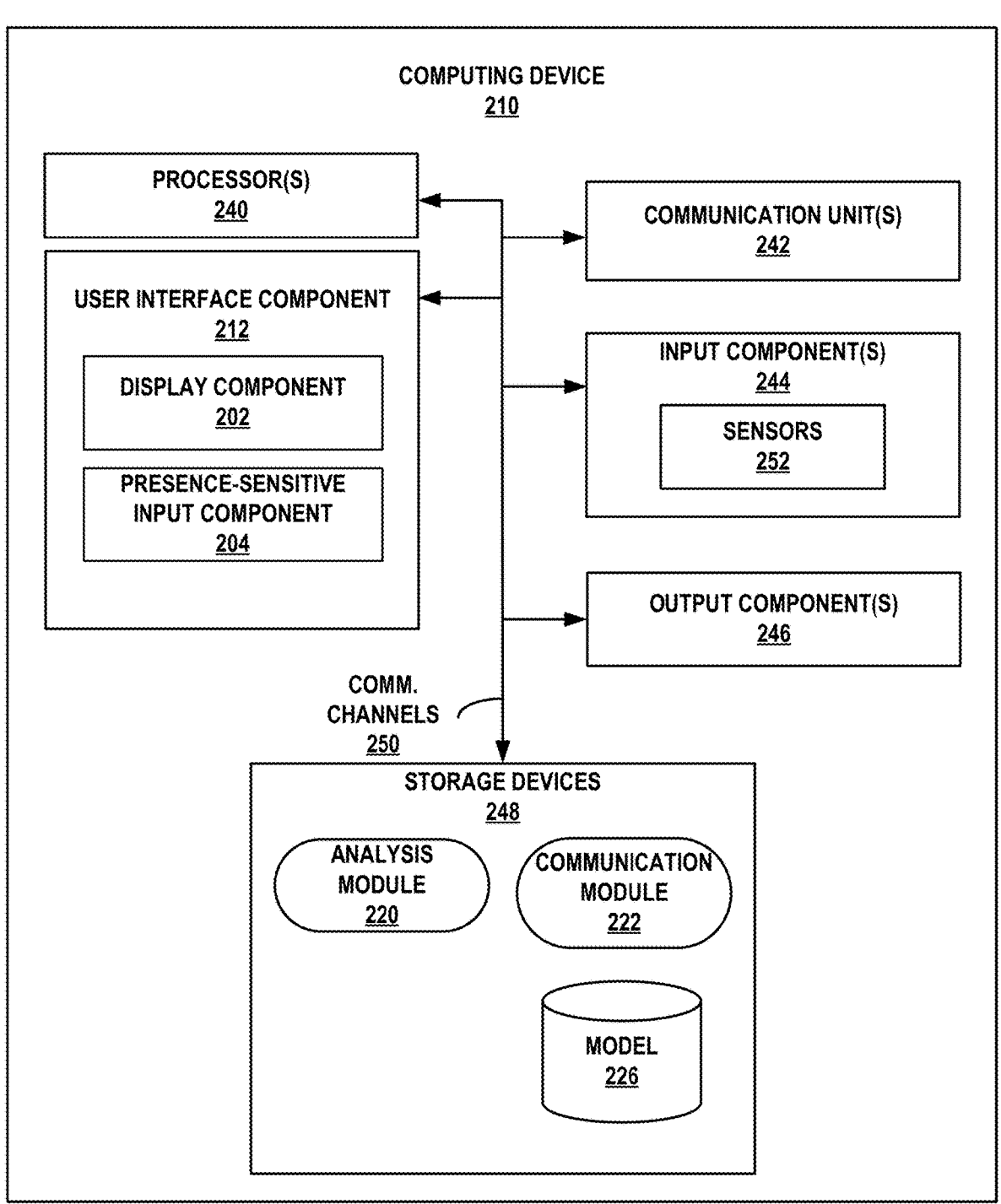
FIG. 2 is a block diagram illustrating a more detailed example of a computing device configured to perform the techniques described herein.

FIG. 2 is a block diagram of a more detailed example of a computing device configured to perform the techniques described herein. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include analysis module 220, communication module 222, and model 226.

One or more processors 240 may implement functionality and/or execute instructions associated with computing device 210 to analyze sensor data and control components of a glass tempering system based on the analyzed sensor data. That is, processors 240 may implement functionality and/or execute instructions associated with computing device 210 to evaluate glass as it proceeds through a tempering system and adjust components of the tempering system based on any detected errors in the glass.

Examples of processors 240 include application processors, display controllers, auxiliary processors, one or more sensor hubs, and any other hardware configured to function as a processor, a processing unit, or a processing device. Modules 220 and 222 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to analyze sensor data and control components of a glass tempering system based on the analyzed sensor data.

Analysis module 220 may execute locally (e.g., at processors 240) to provide functions associated with analyzing the various received sensor data with model 226. In some examples, Analysis module 220 may act as an interface to a remote service accessible to computing device 210. For example, Analysis module 220 may be an interface or application programming interface (API) to a remote server that evaluates the received sensor data and determines adjustments needed for the glass tempering system.

In some examples, communication module 222 may execute locally (e.g., at processors 240) to provide functions associated with receiving the sensor data and controlling the glass tempering system. In some examples, communication module 222 may act as an interface to a remote service accessible to computing device 210. For example, communication module 222 may be an interface or application programming interface (API) to a remote server that receives sensor data from one or more sensors and sends commands to alter aspects of one or more components of a glass tempering system.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and model 226. Storage components 248 may include a memory configured to store data or other information associated with modules 220 and 222 and model 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, include a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques described herein, communication module 222 controls one or more sensors to measure one or more aspects of a piece of glass. Analysis module 220 applies a machine learning model to the one or more aspects of the piece of glass. Based on this analysis, analysis module 220 determines whether to make one or more adjustments to any operation parameters of the glass tempering system in the glassmaking process. In response to determining to make the one or more adjustments, communication module 222 automatically adjusts the operation parameters of the glass tempering system in the glassmaking process. As described with respect to FIG. 1, the included sensors in the glass tempering system may measure any number of pieces of data regarding the glass as it proceeds through the tempering process, including edge quality, vertical flatness, optical haze, washing process variables, furnace process data, production data, thermal scanner images, blower room data, and distortion data, and automatically adjust operation parameters in the glass tempering system that would affect those particular data points in an effort to create tempered glass having optimal quality.

For instance, for edge quality, communication module 222 may, after a first sheet of annealed glass exits an edge seamer operating under an initial set of one or more edging parameters, control a camera system to capture one or more images for one or more edges of the first sheet of annealed glass. The initial set of one or more edging parameters may be any one or more of seaming belt pressure, seaming belt distance from the glass edge, belt pressure, belt rotating speed and glass transfer speed.

Analysis module 220 may analyze the one or more images using machine learning model 226 to determine whether to make one or more adjustments to the initial set of one or more edging parameters. Additionally analysis module 220 may determine one or both of a glass type for the first sheet of annealed glass and a size of the first sheet of annealed glass, as the size and type of the annealed glass can affect which parameters are references in machine learning model 226.

In analyzing the one or more images, analysis module 220 may, for each of the one or more edges of the first sheet of annealed glass, classify, based at least in part on the glass type for the first sheet of annealed glass, the size of the first sheet of annealed glass, and any images from the one or more images of the respective edge, the respective edge into one of a plurality of quality categories using the machine learning model. The plurality of quality categories may include any one or more of an ideal quality, an acceptable quality, a borderline quality, and an unacceptable quality. Based on the one or more of the plurality of quality categories for the respective edge, analysis module 220 may determine whether to adjust the initial set of edging parameters.

To be classified as having an acceptable quality, analysis module 220 may determine, using machine learning model 226, that the respective edge includes one or more of a convolution pattern, a shark teeth pattern, a frost pattern, a rubble pattern, and a run line pattern. To be classified as having a borderline quality, analysis module 220 may determine, using machine learning model 226, that the respective edge includes one or more of a light serration hackle, a light serration hackle with a flake chip, and a shell chip. To be classified as having an unacceptable quality, analysis module 220 may determine, using machine learning model 226, that the respective edge includes one or more of a serration hackle with spalls, impact damage, a heavy shark teeth pattern with a serration hackle, and a deep serration hackle with a deep shark teeth pattern. In response to classifying one of the one or more edges of the first sheet of annealed glass as having the unacceptable quality, communication module 222 may output an alert (e.g., an audio alert or a visual alert) to remove the first sheet of annealed glass from a production line. To be classified as having an ideal quality, analysis module 220 may determine that none of these defects exist in the respective edge.

In response to analysis module 220 determining to make the one or more adjustments to the initial set of one or more edging parameters, communication module 222 may automatically adjust one or more edging parameters in the initial set of one or more edging parameters to develop an updated set of one or more edging parameters. In other words, communication module 222 may control the edge seamer such that the edge seamer operates under the updated set of one or more edging parameters.

When machine learning model 226 includes historical data for the edge seamer, after analyzing the one or more images, analysis module 220 may update machine learning model 226 to develop an updated machine learning model, with the updated machine learning model including an entry comprising at least the initial set of one or more edging parameters and the one or more images. As is the nature of machine learning models, after a second sheet of annealed glass exits the edge seamer operating under the updated set of one or more edging parameters, communication module 222 may control the camera system to capture a second set of one or more images for one or more edges of the second sheet of annealed glass. Analysis module 220 may analyze the second set of one or more images using the updated machine learning model to determine whether to make one or more adjustments to the updated set of one or more edging parameters. In response to analysis module 220 determining to make the one or more adjustments to the updated set of one or more edging parameters, communication module 222 may automatically adjust one or more edging parameters in the updated set of one more edging parameters to develop a second updated set of one or more edging parameters.

In another instance, after a second sheet of annealed glass exits the edge seamer operating under the updated set of one or more edging parameters, communication module 222 may control the camera system to capture a second set of one or more images for one or more edges of the second sheet of annealed glass. Analysis module 220 may analyze the second set of one or more images using machine learning model 226 to determine whether to make one or more adjustments to the updated set of one or more edging parameters. In response to analysis module 220 determining to not make the one or more adjustments to the updated set of one or more edging parameters, communication module 222 may control the edge seamer to continue operating according to the updated set of one or more edging parameters.

In some instances, prior to the first sheet of annealed glass entering a furnace system, communication module 222 may control a second camera system to capture a second set of one or more images for the one or more edges of the first sheet of annealed glass. Analysis module 220 may analyze the second set of one or more images using machine learning model 226 to determine whether to make one or more adjustments to a heating time or a quenching pressure. For instance, if the edges of the first sheet of annealed glass have an acceptable or borderline quality, as defined above, different heating times or quenching pressures may correct the defects found in the respective edge. In response to analysis module 220 determining to make the one or more adjustments to the heating time or the quenching pressure, communication module 220 may automatically adjust one or more of the heating time or the quenching pressure.

For vertical flatness, after a first sheet of tempered glass exits a furnace system operating under an initial set of one or more furnace parameters, and while the first sheet of tempered glass is in a vertical position, communication module 220 may control a scanner system to measure one or more vertical flatness data points for the first sheet of tempered glass. The one or more vertical flatness data points may include one or more of a load pattern for the first sheet of tempered glass, a glass type for the first sheet of tempered glass, and a size of the first sheet of tempered glass. Furthermore, the initial set of one or more furnace parameters may include one or more of heating temperature, convection speed, roller speed, cooling temperature, and fan speed.

Analysis module 220 may apply machine learning model 226 to determine whether to make one or more adjustments to the initial set of one or more furnace parameters based on the one or more vertical flatness data points for the first sheet of tempered glass. For instance, analysis module 220 may compare the load pattern for the first sheet of tempered glass to one or more historical load patterns for sheets of tempered glass with a same glass type and a same size as the first sheet of tempered glass. Analysis module 220 may further compare the initial set of one or more furnace parameters to historical furnace parameters for the sheets of tempered glass with the same glass type and the same size as the first sheet of tempered glass. Based on the load pattern comparison and the furnace parameter comparison, analysis module 220 may determine whether to adjust the initial set of furnace parameters.

In response to analysis module 220 determining to make the one or more adjustments to the initial set of one or more furnace parameters, communication module 222 may automatically adjust one or more furnace parameters in the initial set of one or more furnace parameters to develop an updated set of one or more furnace parameters. These furnace parameters may include any one or more of heating temperature, loading delay, heating time, convection values, air balance, nozzle distance, quench pressure, roller speed, cooling temperature, and fan speed. In automatically adjusting the one or more furnace parameters in the initial set of one or more furnace parameters, communication module

222 may control the furnace system such that the furnace system begins operating under the updated set of one or more furnace parameters.

When machine learning model 226 includes historical data for the furnace system, after applying machine learning model 226, analysis module 220 may update machine learning model 226 to develop an updated machine learning model, wherein the updated machine learning model includes an entry comprising at least the initial set of one or more furnace parameters and the one or more vertical flatness data points.

After a second sheet of tempered glass exits the furnace system operating under the updated set of one or more furnace parameters, and while the second sheet of tempered glass is in the vertical position, communication module 222 may further control the scanner system to measure one or more vertical flatness data points for the second sheet of tempered glass. Analysis module 220 may apply the updated machine learning model to determine whether to make one or more adjustments to the updated set of furnace parameters based on the one or more vertical flatness data points for the second sheet of tempered glass. In response to analysis module 220 determining to make the one or more adjustments to the updated set of one or more furnace parameters, communication module 222 may automatically adjust one or more furnace parameters in the updated set of one more furnace parameters to develop a second updated set of one or more furnace parameters.

In another instance, after a second sheet of tempered glass exits the furnace system operating under the updated set of one or more furnace parameters, and while the second sheet of tempered glass is in the vertical position, communication module 222 may control the scanner system to measure one or more vertical flatness data points for the second sheet of tempered glass. Analysis module 220 may apply machine learning model 226 to determine whether to make one or more adjustments to the updated set of one or more furnace parameters based on the one or more vertical flatness data points for the second sheet of tempered glass. In response to analysis module 220 determining to not make the one or more adjustments to the updated set of one or more furnace parameters, communication module 222 may control the furnace system to continue operating according to the updated set of one or more furnace parameters.

For haze, after a first sheet of tempered glass exits a furnace system operating under an initial set of one or more furnace parameters, communication module 222 may control an optical haze detection system to measure one or more optical haze data points for the first sheet of tempered glass. The one or more optical haze data points for the first sheet of tempered glass may include any one or more of a quantified haze level for the first sheet of tempered glass, a glass type for the first sheet of tempered glass, and a size of the first sheet of tempered glass. Additionally, the initial set of one or more furnace parameters may include any one or more of heating temperature, convection speed, roller speed, cooling temperature, and fan speed.

Analysis module 220 may apply machine learning model 226 to determine whether to make one or more adjustments to the initial set of one or more furnace parameters based on the one or more optical haze data points for the first sheet of tempered glass. In some examples, in applying machine learning model 226, analysis module 220 may compare the quantified haze level for the first sheet of tempered glass to one or more historical quantified haze levels for sheets of tempered glass with a same glass type and a same size as the first sheet of tempered glass. Analysis module 220 may further compare the initial set of one or more furnace parameters to historical furnace parameters for the sheets of tempered glass with the same glass type and the same size as the first sheet of tempered glass. Based on the quantified haze level comparison and the furnace parameter comparison, analysis module 220 may determine whether to adjust the initial set of furnace parameters.

In response to analysis module 220 determining to make the one or more adjustments to the initial set of one or more furnace parameters, communication module 222 may automatically adjust one or more furnace parameters in the initial set of one or more furnace parameters to develop an updated set of one or more furnace parameters. In some instances, automatically adjusting the one or more furnace parameters in the initial set of one or more furnace parameters may include communication module 222 controlling the furnace system such that the furnace system begins operating under the updated set of one or more furnace parameters.

When machine learning model 226 includes historical data for the furnace system, after applying machine learning model 226, analysis module 220 may update machine learning model 226 to develop an updated machine learning model. The updated machine learning model may include an entry comprising at least the initial set of one or more furnace parameters and the one or more optical haze data points.

After a second sheet of tempered glass exits the furnace system operating under the updated set of one or more furnace parameters, communication module 222 may further control the optical haze detection system to measure one or more optical haze data points for the second sheet of tempered glass. Analysis module 220 may apply the updated machine learning model to determine whether to make one or more adjustments to the updated set of one or more furnace parameters based on the one or more optical haze data points for the second sheet of tempered glass. In response to analysis module 220 determining to make the one or more adjustments to the updated set of one or more furnace parameters, communication module 222 may automatically adjust one or more furnace parameters in the updated set of one or more furnace parameters to develop a second updated set of one or more furnace parameters.

In other instances, after a second sheet of tempered glass exits the furnace system operating under the updated set of one or more furnace parameters, communication module 222 may control the optical haze detection system to measure one or more optical haze data points for the second sheet of tempered glass. Analysis module 220 may apply machine learning model 226 to determine whether to make one or more adjustments to the updated set of one or more furnace parameters based on the one or more optical haze data points for the second sheet of tempered glass. In response to analysis module 220 determining to not make the one or more adjustments to the updated set of one or more furnace parameters, communication module 222 may control the furnace system to continue operating according to the updated set of one or more furnace parameters.

It should be understood that any glass tempering system operating in accordance with the techniques described herein may perform analyses on any combination of one or more types of data points described above. Systems are not limited to only analyzing a single type of data point to be operating in accordance with the techniques described herein, nor must a system analyze every type of data point described herein. Rather, a glass tempering system may analyze any combination of one or more data points and adjust any combination of one or more components of the glass tempering system in performing the techniques described herein.

Additionally, for types of data points other than edge quality, vertical flatness, and haze, similar processes may be followed. Communication module 222 may control the sensors responsible for measuring those types of data points to gather measurements for those types of data points. Analysis module 220 may apply machine learning model 226 to that particular type of data point to determine whether adjustments should be made to the glass tempering system component responsible for affecting that type of data point. If analysis module 220 determines that an adjustment should be made to the system to produce higher quality tempered glass, communication module 222 may control that particular component to adjust one or more parameters of that component to change the operation of the component within the glass tempering system. Similarly, analysis module 220 may compare the data points to historical data points for that data point, including for the specific size and type of glass, update machine learning model 226, and maintain the component when the tempered glass is adequate.

Using the techniques described herein, computing device 210 may optimize the various components of a glass tempering system in an effort to create a tempered glass product with minimal defects. By integrating particular sensors placed at particular locations throughout the glass tempering system, computing device 210 may receive real-time, or near real-time, information that provides insight to each step of the glass tempering process as the process is occurring. Computing device 210 applies the machine learning model to that at least near real-time information measured by the particular sensors in order to determine whether there is any portion of the process performing in a sub-optimal manner. By integrating the particular physical machinery components of the glass tempering process into the techniques described herein, computing device 210 can control those physical machinery components using the at least near real-time information measured by the particular sensors in particular locations in order to minimize the amount of defects present in the tempered glass product and reduce the amount of waste resulting from those defects.

Figure 3:
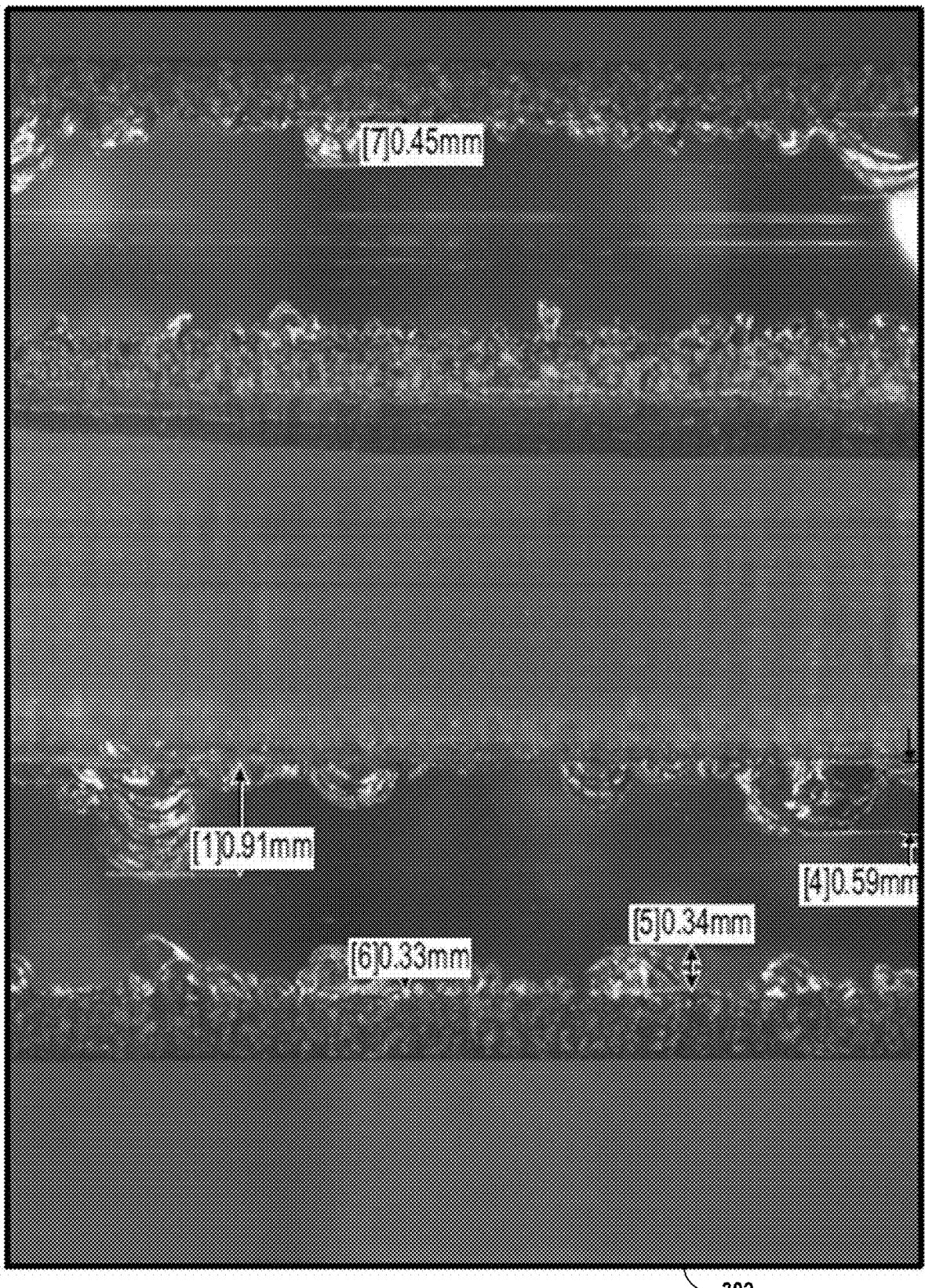
FIG. 3 is an image captured by a camera system to identify one or more defects in an edge of a glass sheet, in accordance with one or more of the techniques described herein.

FIG. 3 is an image 302 captured by a camera system to identify one or more defects in an edge of a glass sheet, in accordance with one or more of the techniques described herein. Computing device 210, or portions thereof (e.g., analysis module 220) may analyze image 302 in an effort to identify particular edge defects in the edge seaming process, among other defects from other processes (e.g., defects after the washing, heating, or quenching processes).

Image 302 shows 5 potential defects. Defect [1] of image 302 is measured, using image analysis based on expected sizes of the glass and expected distances between a camera system and the glass, to be 0.91 mm. Using similar image analysis, computing device 210 may measure defect [4] to be 0.59 mm, defect [5] to be 0.34 mm, defect [6] to be 0.33 mm, and defect [7] to be 0.45 mm. Computing device 210 may also analyze the shapes and locations of the various defects, and/or a total number of the defects. Any one or more of these parameters may be plugged into the machine learning model to determine whether the sheet of glass in image 302 is defective and should be removed from the production line. For instance, if a single defect exceeds a certain size, if a total surface area covered by the defects exceeds a certain amount, if any one or more of the defects are a certain shape or in a certain location, or if a certain number of defects are detected, among other characteristics, computing device 210 may determine that the sheet of glass in image 302 is defective.

Figure 4:
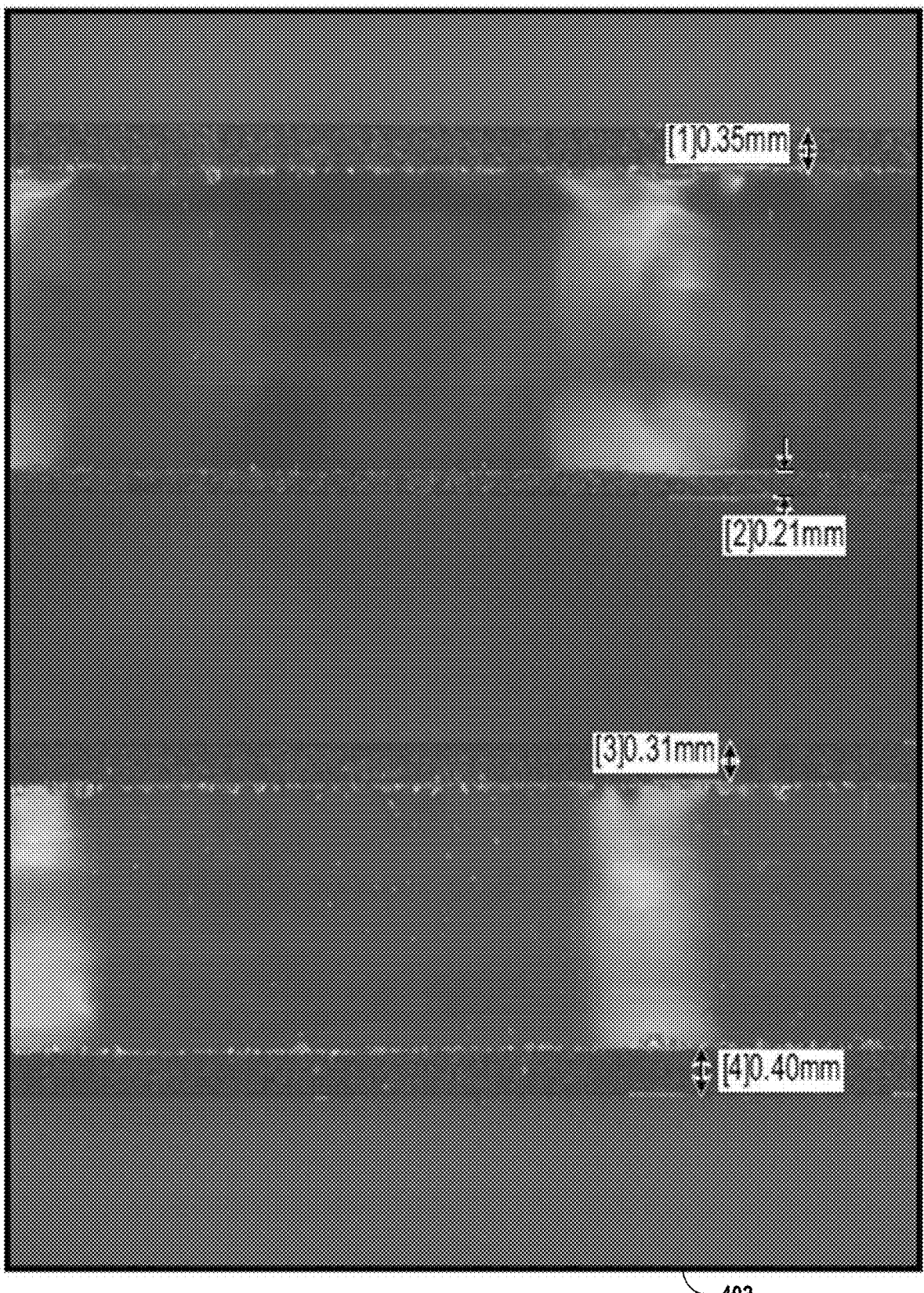
FIG. 4 is an image illustrating two pieces of glass, where the system measures the seaming width and, based on the measurements, various aspects of the glass tempering system may be adjusted, in accordance with one or more of the techniques described herein.

FIG. 4 is an image 402 illustrating two pieces of glass, where the system measures the seaming width and, based on the measurements, various aspects of the glass tempering system may be adjusted, in accordance with one or more of the techniques described herein. Seaming width may be a width of the portion that connects two pieces of glass in a tempering process. If the seaming width is too small, then the glass may be weakened, reducing some of the inherent benefits of tempered glass. Conversely, if the seaming width is too large, then the glass may have clarity issues or may be too thick for its intended purpose.

Image 402 shows 4 seams. Seam [1] of image 402 is measured, using image analysis based on expected sizes of the glass and expected distances between a camera system and the glass, to be 0.35 mm. Using similar image analysis, computing device 210 may measure seam [2] to be 0.21 mm, seam [3] to be 0.31 mm, and seam [4] to be 0.40 mm. Based on these measurements, computing device 210 may determine whether the seams are of an adequate width or if the glass should be discarded.

Figures 5A, 5B, 5C, 5D, 5E, 5F, 5G, 5H, 5I, 5J, 5K:
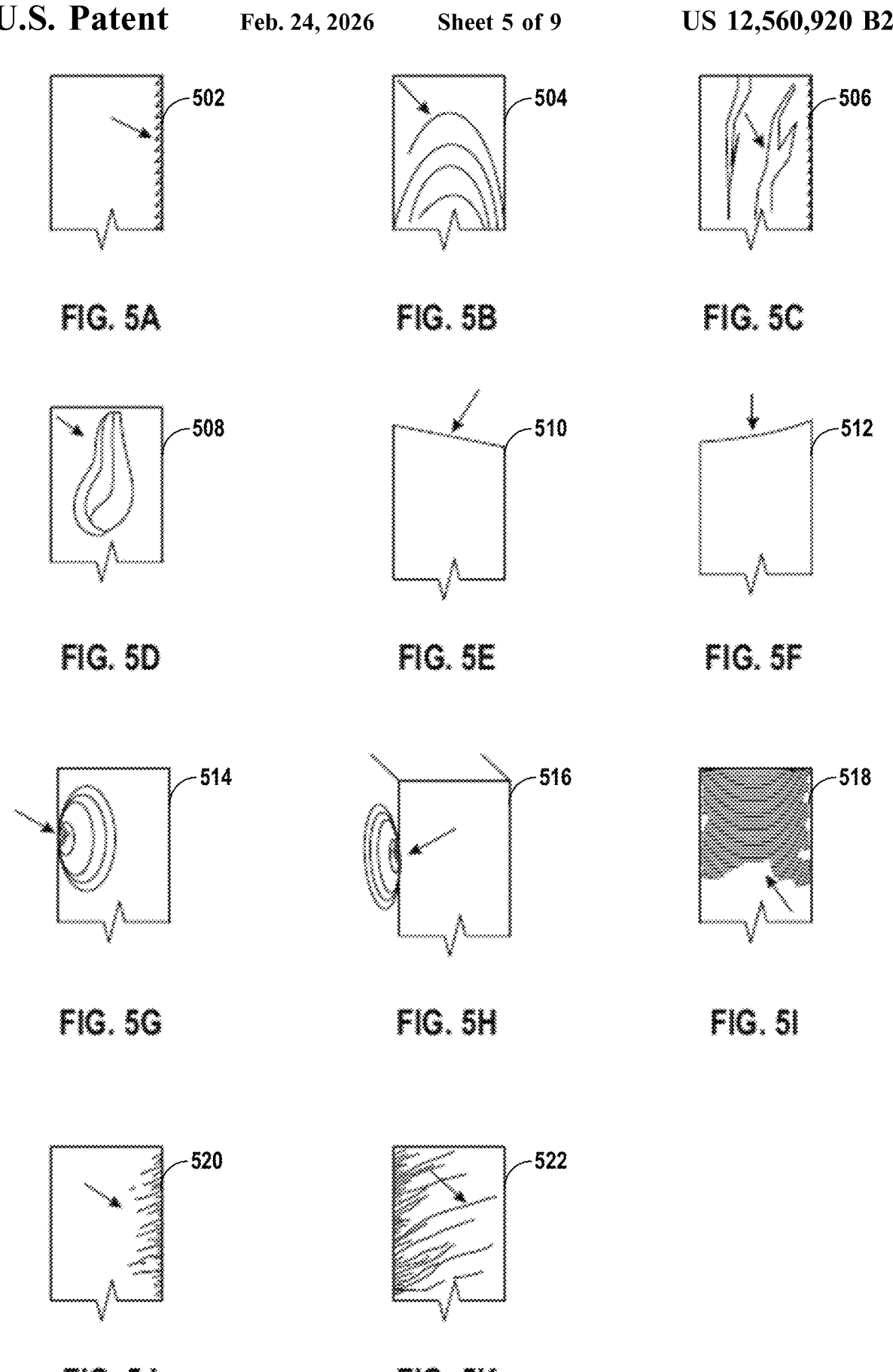
FIGS. 5A-5K are conceptual diagrams illustrating various chips, defects, or other errors in edges of glass, in accordance with one or more of the techniques described herein.

FIGS. 5A-5K are conceptual diagrams illustrating various chips, defects, or other errors in edges of glass, in accordance with one or more of the techniques described herein. FIG. 5A shows glass section 502 with a wheel score defect on an edge. A wheel score defect is a furrow made by a glass cutting tool.

FIG. 5B shows glass section 504 with a run line defect. Run lines, while not a weakening factor, can still cause issues with tempered glass. Run lines are smooth, rolling lines on an edge of the glass.

FIG. 5C shows glass section 506 with convolutions. Convolutions, while not a weakening factor, can still cause issues with tempered glass. Convolutions are smooth, rolling surfaces on an edge of the glass.

FIG. 5D shows glass section 508 with a frost defect, or a rubble defect. Frost/rubble defects, while not a weakening factor, can still cause issues with tempered glass. Frost/rubble defects are a fine grain effect on a glass edge.

FIG. 5E shows glass section 510 with a beveled edge. A beveled edge is an edge that is not perpendicular to a surface of the glass.

FIG. 5F shows glass section 512 with a flare. A flare is a sharp protrusion at a junction of an edge and the glass surface. Flares are particularly susceptible to damage.

FIG. 5G shows glass section 514 with a flake chip edge. A flakes ship edge is a smooth, shallow chip occurring in an edge surface. Flake chips increase the possibility of breakage as the size and density of the chips increase.

FIG. 5H shows glass section 516 with a shell chip on a surface. A shell chip is a smooth, shallow chip occurring in a surface near an edge of the glass. Shell chips increase the possibility of breakage as the size and density of the chips increase.

FIG. 5I shows glass section 518 with a modification. Modifications, while not a weakening factor, can still cause issues with tempered glass. A modification is a fine grain effect on a glass edge due to mechanical removal of an edge characteristic.

FIG. 5J shows glass section 520 with a serration hackle. Serration hackles are edge imperfections that are typically perpendicular to a glass surface opposite a wheel score. Serration hackles increase the possibility of breakage as the depth and density of the serration hackles increase.

FIG. 5K shows glass section 522 with a sharks teeth pattern. Sharks teeth are jaggerlike imperfections which start from a scored surface. Sharks teeth increase the possibility of breakage as the depth, roughness, and number of the sharks teeth increase.

Figure 6:
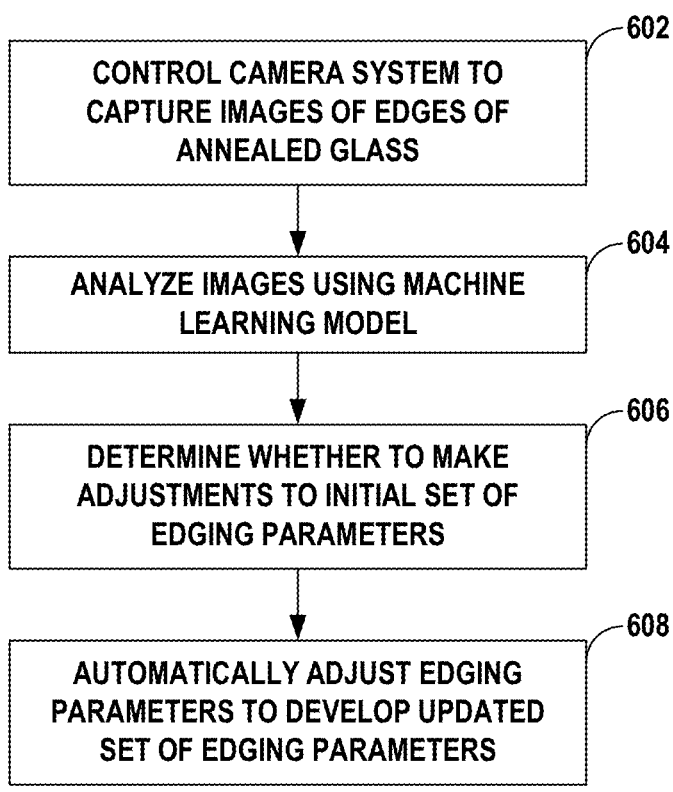
FIG. 6 is a flow diagram illustrating an example process for analyzing images of edges of annealed glass and adjusting one or more edging parameters to optimize the edging process, in accordance with one or more of the techniques described herein.

FIG. 6 is a flow diagram illustrating an example process for analyzing images of edges of annealed glass and adjusting one or more edging parameters to optimize the edging process, in accordance with one or more of the techniques described herein. The techniques of FIG. 6 may be performed by one or more processors of a computing device, such as computing device 110 of FIG. 1 and/or computing device 210 illustrated in FIG. 2. For purposes of illustration only, the techniques of FIG. 6 are described within the context of computing device 210 of FIG. 2, although computing devices having configurations different than that of computing device 210 may perform the techniques of FIG. 6.

In accordance with the techniques described herein, after a first sheet of annealed glass exits an edge seamer operating under an initial set of one or more edging parameters, communication module 222 controls a camera system to capture one or more images for one or more edges of the first sheet of annealed glass (602). Analysis module 220 analyzes the one or more images using machine learning model 226 (604) and determines whether to make one or more adjustments to the initial set of one or more edging parameters (606). In response to determining to make the one or more adjustments to the initial set of one or more edging parameters, communication module 222 automatically adjusts one or more edging parameters in the initial set of one or more edging parameters to develop an updated set of one or more edging parameters (608).

Figure 7:
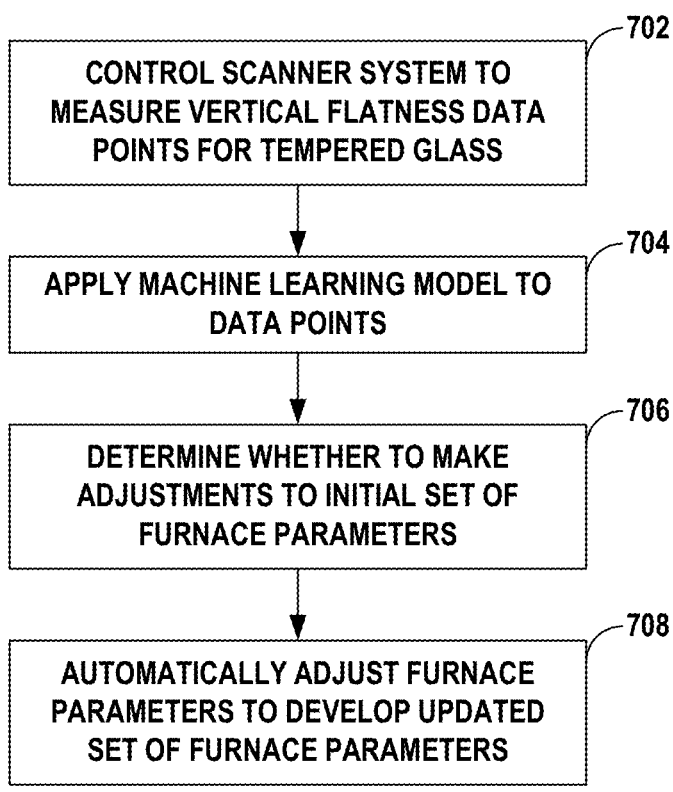
FIG. 7 is a flow diagram illustrating an example process for analyzing vertical flatness data points of tempered glass and adjusting one or more furnace parameters to optimize the tempering process, in accordance with one or more of the techniques described herein.

FIG. 7 is a flow diagram illustrating an example process for analyzing vertical flatness data points of tempered glass and adjusting one or more furnace parameters to optimize the tempering process, in accordance with one or more of the techniques described herein. The techniques of FIG. 7 may be performed by one or more processors of a computing device, such as computing device 110 of FIG. 1 and/or computing device 210 illustrated in FIG. 2. For purposes of illustration only, the techniques of FIG. 7 are described within the context of computing device 210 of FIG. 2, although computing devices having configurations different than that of computing device 210 may perform the techniques of FIG. 7.

In accordance with the techniques described herein, after a first sheet of tempered glass exits a furnace system operating under an initial set of one or more furnace parameters, and while the first sheet of tempered glass is in a vertical position, communication module 222 controls a scanner system to measure one or more vertical flatness data points for the first sheet of tempered glass (702). Analysis module 220 applies machine learning model 226 (704) to determine whether to make one or more adjustments to the initial set of one or more furnace parameters based on the one or more vertical flatness data points for the first sheet of tempered glass (706). In response to determining to make the one or more adjustments to the initial set of one or more furnace parameters, communication module 222 automatically adjusts one or more furnace parameters in the initial set of one or more furnace parameters to develop an updated set of one or more furnace parameters (708).

Figure 8:
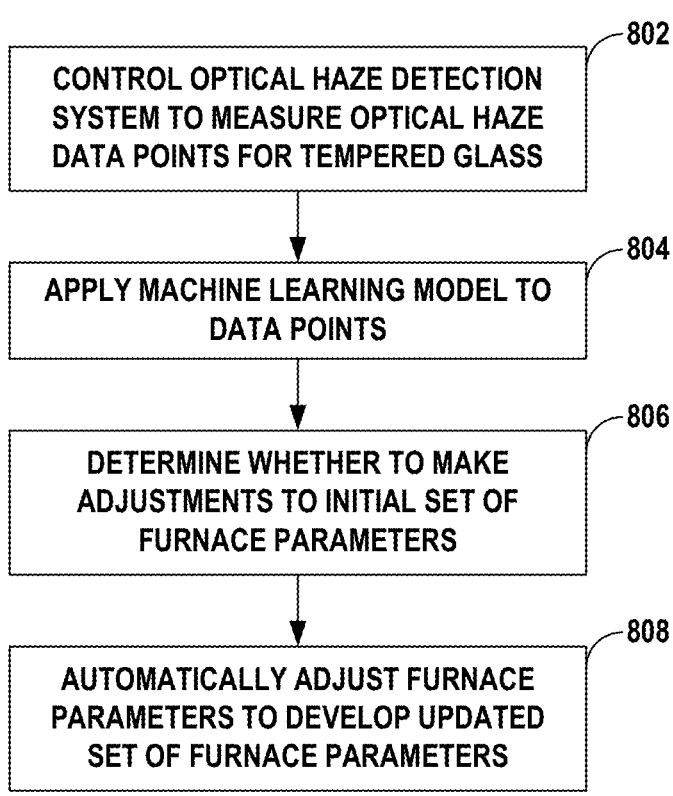
FIG. 8 is a flow diagram illustrating an example process for analyzing optical haze data points of tempered glass and adjusting one or more furnace parameters to optimize the tempering process, in accordance with one or more of the techniques described herein.

FIG. 8 is a flow diagram illustrating an example process for analyzing optical haze data points of tempered glass and adjusting one or more furnace parameters to optimize the tempering process, in accordance with one or more of the techniques described herein. The techniques of FIG. 8 may be performed by one or more processors of a computing device, such as computing device 110 of FIG. 1 and/or computing device 210 illustrated in FIG. 2. For purposes of illustration only, the techniques of FIG. 8 are described within the context of computing device 210 of FIG. 2, although computing devices having configurations different than that of computing device 210 may perform the techniques of FIG. 8.

In accordance with the techniques described herein, after a first sheet of tempered glass exits a furnace system operating under an initial set of one or more furnace parameters, communication module 222 controls an optical haze detection system to measure one or more optical haze data points for the first sheet of tempered glass (802). Analysis module 220 applies machine learning model 226 (804) to determine whether to make one or more adjustments to the initial set of one or more furnace parameters based on the one or more optical haze data points for the first sheet of tempered glass (806). In response to determining to make the one or more adjustments to the initial set of one or more furnace parameters, communication module 222 automatically adjusts one or more furnace parameters in the initial set of one or more furnace parameters to develop an updated set of one or more furnace parameters.

Figure 9:
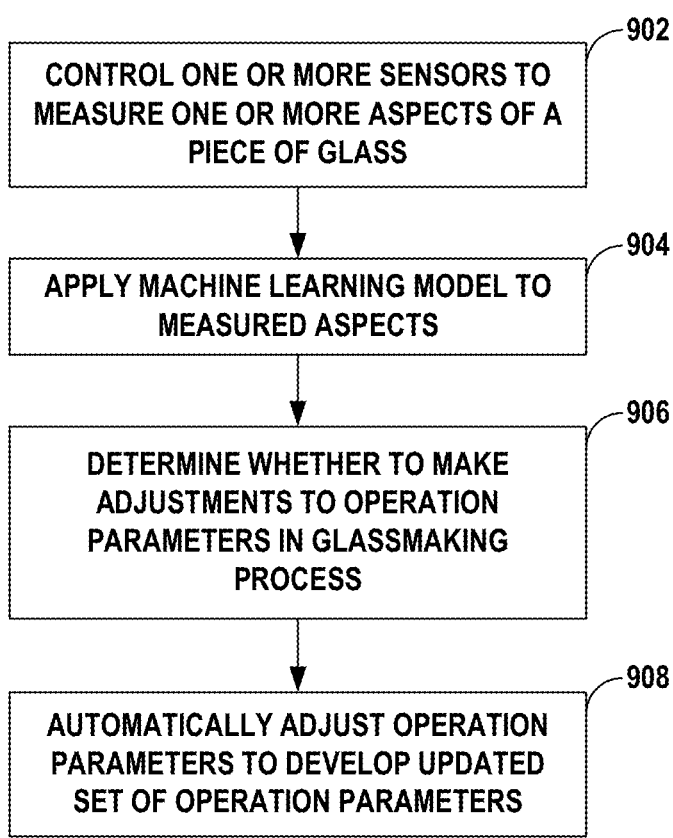
FIG. 9 is a flow diagram illustrating an example process for analyzing aspects of glass and adjusting one or more operation parameters to optimize the glassmaking process, in accordance with one or more of the techniques described herein.

FIG. 9 is a flow diagram illustrating an example process for analyzing aspects of glass and adjusting one or more operation parameters to optimize the glassmaking process, in accordance with one or more of the techniques described herein. The techniques of FIG. 9 may be performed by one or more processors of a computing device, such as computing device 110 of FIG. 1 and/or computing device 210 illustrated in FIG. 2. For purposes of illustration only, the techniques of FIG. 9 are described within the context of computing device 210 of FIG. 2, although computing devices having configurations different than that of computing device 210 may perform the techniques of FIG. 9.

In accordance with the techniques described herein, communication module 222 controls one or more sensors to measure one or more aspects of a piece of glass (902). Analysis module 220 applies a machine learning model to the one or more aspects of the piece of glass (904). Based on this analysis, analysis module 220 determines whether to make one or more adjustments to any operation parameters of the glass tempering system in the glassmaking process (906). In response to determining to make the one or more adjustments, communication module 222 automatically adjusts the operation parameters of the glass tempering system in the glassmaking process (908).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:

after a first sheet of tempered glass exits a furnace system operating under an initial set of one or more furnace parameters, and while the first sheet of tempered glass is in a vertical position, controlling, by one or more processors, a scanner system to measure one or more vertical flatness data points for the first sheet of tempered glass;

applying, by the one or more processors, a machine learning model to determine whether to make one or more adjustments to the initial set of one or more furnace parameters based on the one or more vertical flatness data points for the first sheet of tempered glass, wherein the machine learning model comprises historical data for the furnace system;

in response to determining to make the one or more adjustments to the initial set of one or more furnace parameters, automatically adjusting, by the one or more processors, one or more furnace parameters in the initial set of one or more furnace parameters to develop an updated set of one or more furnace parameters; and after applying the machine learning model, updating, by the one or more processors, the machine learning model to develop an updated machine learning model, wherein the updated machine learning model includes an entry comprising at least the initial set of one or more furnace parameters and the one or more vertical flatness data points.

2. The method of claim 1, further comprising:

after a second sheet of tempered glass exits the furnace system operating under the updated set of one or more furnace parameters, and while the second sheet of tempered glass is in the vertical position, controlling, by the one or more processors, the scanner system to measure one or more vertical flatness data points for the second sheet of tempered glass;

applying, by the one or more processors, the updated machine learning model to determine whether to make one or more adjustments to the updated set of furnace parameters based on the one or more vertical flatness data points for the second sheet of tempered glass; and in response to determining to make the one or more adjustments to the updated set of one or more furnace parameters, automatically adjusting, by the one or more processors, one or more furnace parameters in the updated set of one more furnace parameters to develop a second updated set of one or more furnace parameters.

3. The method of claim 1, wherein automatically adjusting the one or more furnace parameters in the initial set of one or more furnace parameters comprises controlling, by the one or more processors, the furnace system such that the furnace system begins operating under the updated set of one or more furnace parameters.

4. The method of claim 1, wherein the one or more vertical flatness data points include one or more of a load pattern for the first sheet of tempered glass, a glass type for the first sheet of tempered glass, and a size of the first sheet of tempered glass.

5. The method of claim 4, wherein applying the machine learning model comprises:

comparing, by the one or more processors, the load pattern for the first sheet of tempered glass to one or more historical load patterns for sheets of tempered glass with a same glass type and a same size as the first sheet of tempered glass;

comparing, by the one or more processors, the initial set of one or more furnace parameters to historical furnace parameters for the sheets of tempered glass with the same glass type and the same size as the first sheet of tempered glass; and based on the load pattern comparison and the furnace parameter comparison, determining, by the one or more processors, whether to adjust the initial set of furnace parameters.

6. The method of claim 1, further comprising:

after a second sheet of tempered glass exits the furnace system operating under the updated set of one or more furnace parameters, and while the second sheet of tempered glass is in the vertical position, controlling, by the one or more processors, the scanner system to measure one or more vertical flatness data points for the second sheet of tempered glass;

applying, by the one or more processors, the machine learning model to determine whether to make one or more adjustments to the updated set of one or more furnace parameters based on the one or more vertical flatness data points for the second sheet of tempered glass; and in response to determining to not make the one or more adjustments to the updated set of one or more furnace parameters, controlling, by the one or more processors, the furnace system to continue operating according to the updated set of one or more furnace parameters.

7. The method of claim 1, wherein the furnace system comprises one or more of a heating component and a quench component.

8. The method of claim 7, wherein the heating component comprises a tempering oven.

9. The method of claim 7, wherein the quench component comprises a series of one or more air blowers.

10. The method of claim 1, wherein the initial set of one or more furnace parameters comprises one or more of heating temperature, loading delay, heating time, convection values, air balance, nozzle distance, quench pressure, roller speed, cooling temperature, and fan speed.

11. A device comprising:

a memory; and one or more processors configured to:

after a first sheet of tempered glass exits a furnace system operating under an initial set of one or more furnace parameters, and while the first sheet of tempered glass is in a vertical position, control a scanner system to measure one or more vertical flatness data points for the first sheet of tempered glass;

apply a machine learning model to determine whether to make one or more adjustments to the initial set of one or more furnace parameters based on the one or more vertical flatness data points for the first sheet of tempered glass;

in response to determining to make the one or more adjustments to the initial set of one or more furnace parameters, automatically adjust one or more furnace parameters in the initial set of one or more furnace parameters to develop an updated set of one or more furnace parameters;

after a second sheet of tempered glass exits the furnace system operating under the updated set of one or more furnace parameters, and while the second sheet of tempered glass is in the vertical position, control the scanner system to measure one or more vertical flatness data points for the second sheet of tempered glass;

apply the machine learning model to determine whether to make one or more adjustments to the updated set of one or more furnace parameters based on the one or more vertical flatness data points for the second sheet of tempered glass; and in response to determining to not make the one or more adjustments to the updated set of one or more furnace parameters, control the furnace system to continue operating according to the updated set of one or more furnace parameters.

12. The device of claim 11, wherein the machine learning model comprises historical data for the furnace system, and wherein the one or more processors are further configured to:

after applying the machine learning model, update the machine learning model to develop an updated machine learning model, wherein the updated machine learning model includes an entry comprising at least the initial set of one or more furnace parameters and the one or more vertical flatness data points;

after a second sheet of tempered glass exits the furnace system operating under the updated set of one or more furnace parameters, and while the second sheet of tempered glass is in the vertical position, control the scanner system to measure one or more vertical flatness data points for the second sheet of tempered glass;

apply the updated machine learning model to determine whether to make one or more adjustments to the updated set of furnace parameters based on the one or more vertical flatness data points for the second sheet of tempered glass; and in response to determining to make the one or more adjustments to the updated set of one or more furnace parameters, automatically adjust one or more furnace parameters in the updated set of one more furnace parameters to develop a second updated set of one or more furnace parameters.

13. The device of claim 11, wherein the one or more processors being configured to automatically adjust the one or more furnace parameters in the initial set of one or more furnace parameters comprises the one or more processors being configured to control the furnace system such that the furnace system begins operating under the updated set of one or more furnace parameters.

14. The device of claim 11, wherein the one or more vertical flatness data points include one or more of a load pattern for the first sheet of tempered glass, a glass type for the first sheet of tempered glass, and a size of the first sheet of tempered glass, and wherein the one or more processors being configured to apply the machine learning model comprises the one or more processors being configured to:

compare the load pattern for the first sheet of tempered glass to one or more historical load patterns for sheets of tempered glass with a same glass type and a same size as the first sheet of tempered glass;

compare the initial set of one or more furnace parameters to historical furnace parameters for the sheets of tempered glass with the same glass type and the same size as the first sheet of tempered glass; and based on the load pattern comparison and the furnace parameter comparison, determine whether to adjust the initial set of furnace parameters.

15. A system comprising:

a furnace system operating under an initial set of one or more furnace parameters;

a scanner system;

a quench component comprising a series of one or more air blowers; and one or more processors configured to:

after a first sheet of tempered glass exits the furnace system, and while the first sheet of tempered glass is in a vertical position, control the scanner system to measure one or more vertical flatness data points for the first sheet of tempered glass;

apply a machine learning model to determine whether to make one or more adjustments to the initial set of one or more furnace parameters based on the one or more vertical flatness data points for the first sheet of tempered glass, wherein the machine learning model comprises historical data for the furnace system;

after applying the machine learning model, update the machine learning model to develop an updated machine learning model, wherein the updated machine learning model includes an entry comprising at least the initial set of one or more furnace parameters and the one or more vertical flatness data points;

in response to determining to make the one or more adjustments to the initial set of one or more furnace parameters, automatically adjust one or more furnace parameters in the initial set of one or more furnace parameters to develop an updated set of one or more furnace parameters;

after a second sheet of tempered glass exits the furnace system operating under the updated set of one or more furnace parameters, and while the second sheet of tempered glass is in the vertical position, control the scanner system to measure one or more vertical flatness data points for the second sheet of tempered glass;

apply the updated machine learning model to determine whether to make one or more adjustments to the updated set of furnace parameters based on the one or more vertical flatness data points for the second sheet of tempered glass; and in response to determining to make the one or more adjustments to the updated set of one or more furnace parameters, automatically adjust one or more furnace parameters in the updated set of one more furnace parameters to develop a second updated set of one or more furnace parameters.

16. The system of claim 15, wherein the one or more processors are further configured to:

after a second sheet of tempered glass exits the furnace system operating under the updated set of one or more furnace parameters, and while the second sheet of tempered glass is in the vertical position, control the scanner system to measure one or more vertical flatness data points for the second sheet of tempered glass;

apply the machine learning model to determine whether to make one or more adjustments to the updated set of one or more furnace parameters based on the one or more vertical flatness data points for the second sheet of tempered glass; and in response to determining to not make the one or more adjustments to the updated set of one or more furnace parameters, control the furnace system to continue operating according to the updated set of one or more furnace parameters.

17. A system comprising:

a furnace system operating under an initial set of one or more furnace parameters;

a scanner system;

a quench component comprising a series of one or more air blowers; and one or more processors configured to:

after a first sheet of tempered glass exits the furnace system, and while the first sheet of tempered glass is in a vertical position, control the scanner system to measure one or more vertical flatness data points for the first sheet of tempered glass, wherein the one or more vertical flatness data points include one or more of a load pattern for the first sheet of tempered glass, a glass type for the first sheet of tempered glass, and a size of the first sheet of tempered glass;

apply a machine learning model to determine whether to make one or more adjustments to the initial set of one or more furnace parameters based on the one or more vertical flatness data points for the first sheet of tempered glass, wherein the one or more processors being configured to apply the machine learning model comprises the one or more processors being configured to:

compare the load pattern for the first sheet of tempered glass to one or more historical load patterns for sheets of tempered glass with a same glass type and a same size as the first sheet of tempered glass;

compare the initial set of one or more furnace parameters to historical furnace parameters for the sheets of tempered glass with the same glass type and the same size as the first sheet of tempered glass; and based on the load pattern comparison and the furnace parameter comparison, determine whether to adjust the initial set of furnace parameters; and in response to determining to make the one or more adjustments to the initial set of one or more furnace parameters, automatically adjust one or more furnace parameters in the initial set of one or more furnace parameters to develop an updated set of one or more furnace parameters.

* * * * *